United States Patent [19]

Suzuki et al.

[11] Patent Number: 5,314,236
[45] Date of Patent: May 24, 1994

[54] LUMBAR SUPPORT APPARATUS FOR VEHICULAR SEAT

[75] Inventors: Mamoru Suzuki, Kanagawa; Shinya Inabe; Junko Seki, both of Tokyo, all of Japan

[73] Assignee: Ikeda Bussan Co., Ltd., Ayase, Japan

[21] Appl. No.: 931,382

[22] Filed: Aug. 18, 1992

[30] Foreign Application Priority Data

Aug. 22, 1991 [JP] Japan .............................. 3-074226[U]

[51] Int. Cl.⁵ ................................................ A47C 3/00
[52] U.S. Cl. ............................... 297/284.8; 297/284.4
[58] Field of Search ................ 297/284.1, 284.4, 284.8

[56] References Cited

U.S. PATENT DOCUMENTS

| | | | |
|---|---|---|---|
| 3,807,794 | 4/1974 | Beyer | 297/284.4 |
| 3,890,000 | 6/1975 | Easley | 297/284.4 |
| 4,531,779 | 7/1985 | Hashimoto | 297/284 |
| 4,714,291 | 12/1987 | Hattori et al. | 297/284.1 |
| 4,896,918 | 1/1990 | Hoshihara | 297/284.4 |
| 5,011,223 | 4/1991 | Kato | 297/284.1 |
| 5,078,449 | 1/1992 | Suzuki | 297/284.4 |
| 5,215,350 | 6/1993 | Kato | 297/284.4 |

FOREIGN PATENT DOCUMENTS

| | | |
|---|---|---|
| 0026668 | 4/1981 | European Pat. Off. . |
| 3710466 | 10/1987 | Fed. Rep. of Germany ... 297/284.4 |
| 51-163224 | 12/1976 | Japan . |
| 57-19965 | 4/1982 | Japan . |
| 1011726 | 12/1965 | United Kingdom . |
| 2068718 | 8/1981 | United Kingdom . |

*Primary Examiner*—Kenneth J. Dorner
*Assistant Examiner*—Milton Nelson, Jr.
*Attorney, Agent, or Firm*—Foley & Lardner

[57] ABSTRACT

A lumbar support apparatus installed in a seat back of a vehicular seat has a panel which is movable in front-and-aft direction. A U-shaped spring member is connected at its bent middle portion to the panel and pivotably supported at its opposite ends to a bracket fixed to a seat back frame. A control mechanism for moving the panel in the front-and-aft direction is disposed between the spring member and a pipe frame of the seat back frame. The control mechanism is fixedly in contact with the pipe frame through a stopper member so as to transmit the force from the spring member to the seat back frame in the front-and-aft direction.

7 Claims, 5 Drawing Sheets

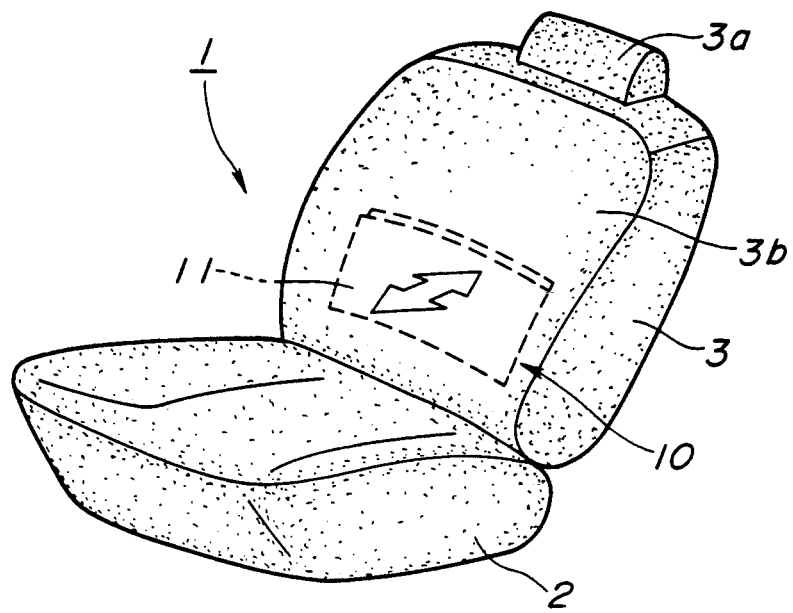
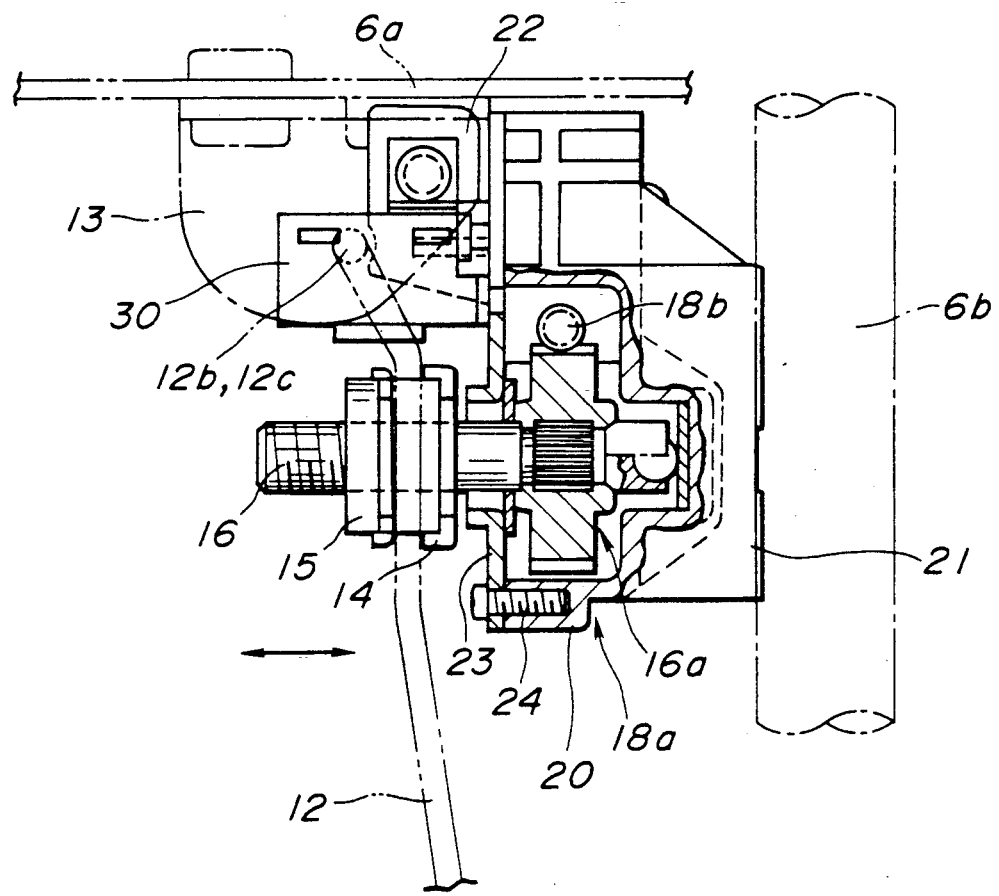

LUMBAR SUPPORT APPARATUS FOR VEHICULAR SEAT

BACKGROUND OF THE INVENTION

1. Field of the Invention

The present invention relates to improvements in a lumbar support applied to a seat back of a vehicular seat, and more particularly to a lumbar support apparatus which supports a lower back or lumbar section of a seated occupant so as to improve the comfort of the occupant.

2. Description of the Prior Art

A variety of lumbar support apparatuses have been proposed and put into practical use in order to reduce fatigue of a seated occupant during long drives. A typical lumbar support apparatus is disclosed, for example, in Japanese Utility Model Provisional Publication No. 51-163224 and Japanese Patent Publication No. 57-19965. Such a lumbar support apparatus is arranged such that the hardness of a cushion member in the seat back is continuously variable by controlling a screw adjusting device connected to a spring member in the seat back. With the conventional hardness adjusting device, the hardness of the seat back is continuously variable at a location corresponding to the lumbar portion of the seated occupant while at the same time the impact durability is improved.

However, the conventional lumbar support apparatus suffers drawbacks, since the assembly operation is complicated, large amount of parts are required and installation involves many steps. Therefore, this system is costly to produce.

SUMMARY OF THE INVENTION

It is an object of the present invention to provide an improved lumbar support apparatus which is free of the above-mentioned drawbacks.

A lumbar support apparatus according to the present invention is applied to a vehicular seat. The vehicular seat has a seat back in which a seat back frame comprising a pair of side panels and a lower pipe frame is disposed. The lumbar support apparatus comprises a supporting panel and a bracket fixed to one of the side panels. A spring member is connected at one end to a back side of the supporting member and pivotably supported at its other end to the bracket. A control mechanism is connected to the bracket, and disposed between the spring member and the lower pipe in the front-and-aft direction of the seat back. The control mechanism includes a nut member and a screw shaft. The nut member supports the spring member at a portion near the pivotably supported end. The screw shaft is screwed into the nut member. The spring member is moved in a front-and-aft direction according to the rotation of said screw shaft.

With this arrangement, the assembly operation is easily carried out in a manner that the spring member is directly connected to the bracket with one step action. Furthermore, since the spring member is arranged such that its portion near the end portions is pushed through the nut member by the control mechanism, the apparatus can be made small in size.

BRIEF DESCRIPTION OF THE DRAWINGS

FIG. 1 is a perspective view of a seat applying an embodiment of a lumbar support apparatus according to the present invention;

FIG. 2 is an enlarged plan view, partly in section, of the lumbar support apparatus applied to the seat of FIG. 1;

DETAILED DESCRIPTION OF THE INVENTION

Referring to FIGS. 1 to 8, there is shown a preferred embodiment of a lumbar support apparatus 10 according to the present invention.

Figure 4:
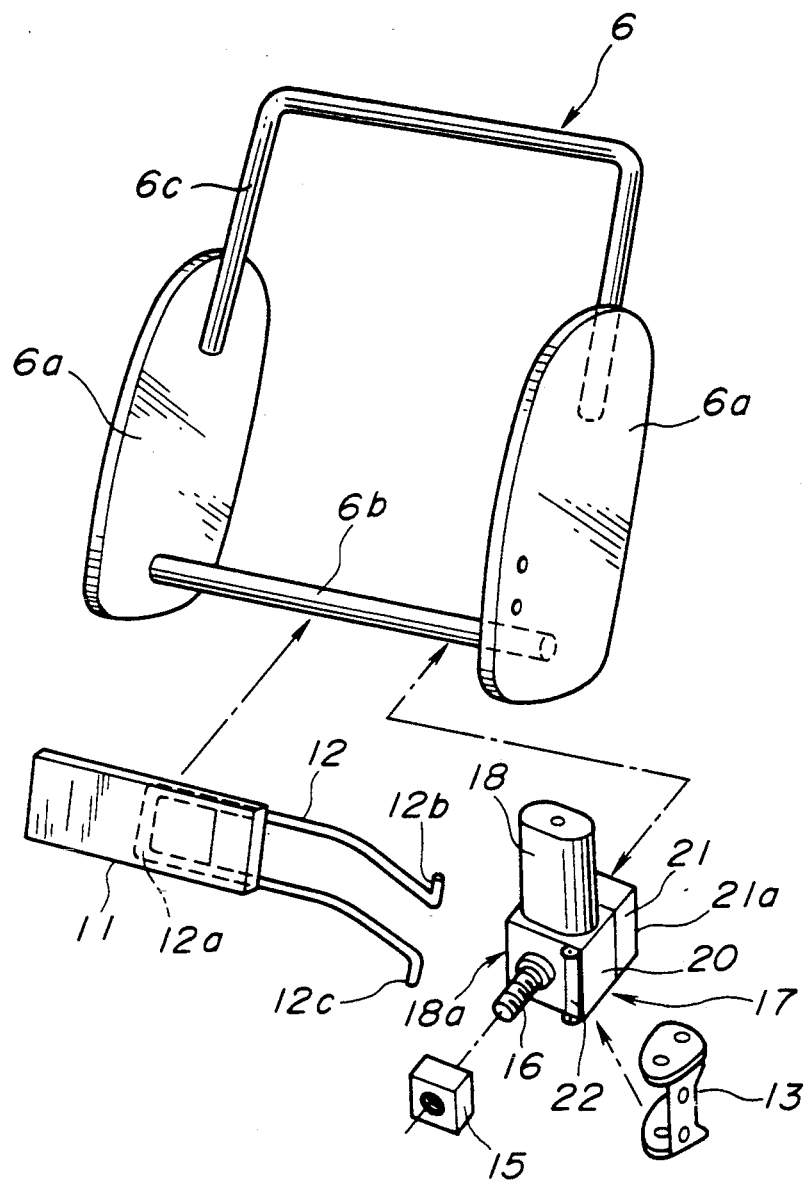
FIG. 4 is an exploded perspective view of the lumbar support apparatus and a seat back frame.

As shown in FIG. 1, the lumbar support apparatus 10 is applied to a vehicular seat 1 which includes a seat cushion 2 and a seat back 3 providing a headrest 3a thereon. The lumbar support apparatus 10 is disposed in the seat back 3 so as to be located at a central and lower portion of the seat back 3. The seat back 3 is provided with a seat back frame 6 covered with a cover member 3b. The seat back frame 6 comprises a pair of side panels 6a and upper and lower pipe frames 6c and 6b, respectively, as shown in FIG. 4. The lower pipe frame 6b may be a straight pipe which is disposed between the opposite side panels 6a and fixedly connected to them.

Figure 5:
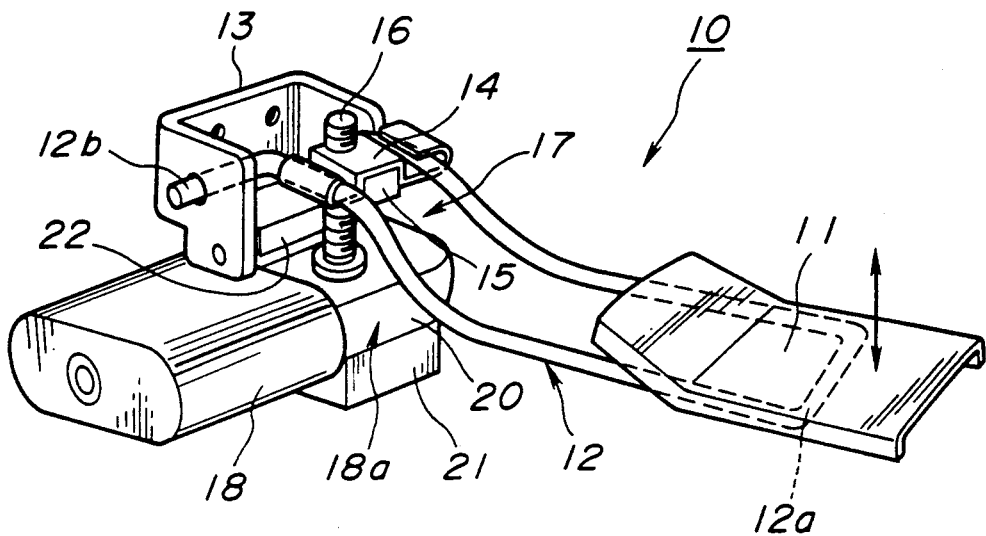
FIG. 5 is an enlarged perspective view of an essential part of the lumbar support apparatus of FIG. 2.

The lumbar support apparatus 10 comprises a support panel 11 which is disposed at a front side portion in the seat back 3 so as to be movable in front-and-aft directions, as shown in FIGS. 4 and 5. A spring member 12 is generally U-shaped and in contact at its base end portion 12a with a back surface of the panel 11, as shown in FIG. 4. The spring member 12 is pivotably supported at its end portions 12b and 12c to a bracket 13 fixed to one side panel 6a of the seat back frame 6 by means of screws. A control mechanism 17 includes a nut member 15 and a screw shaft 16. The nut member 15 is connected to a supporting bracket 14 which slidably supports the spring member 12 at a portion near the end portions 12b and 12c. The nut member 15 is screwed onto the screw shaft 16 such that the spring member 12 is swingingly movable toward the front side of the cover member 3b in accordance with the rotation of the screw shaft 16. A casing 20 of the control mechanism 17 is made of synthetic resin and connected to the lower pipe frame 6b of the seat back frame 6. A stopper portion 21 is provided with an arcuate portion 21a which is fixedly in contact with the lower pipe frame 6b.

Figure 7:
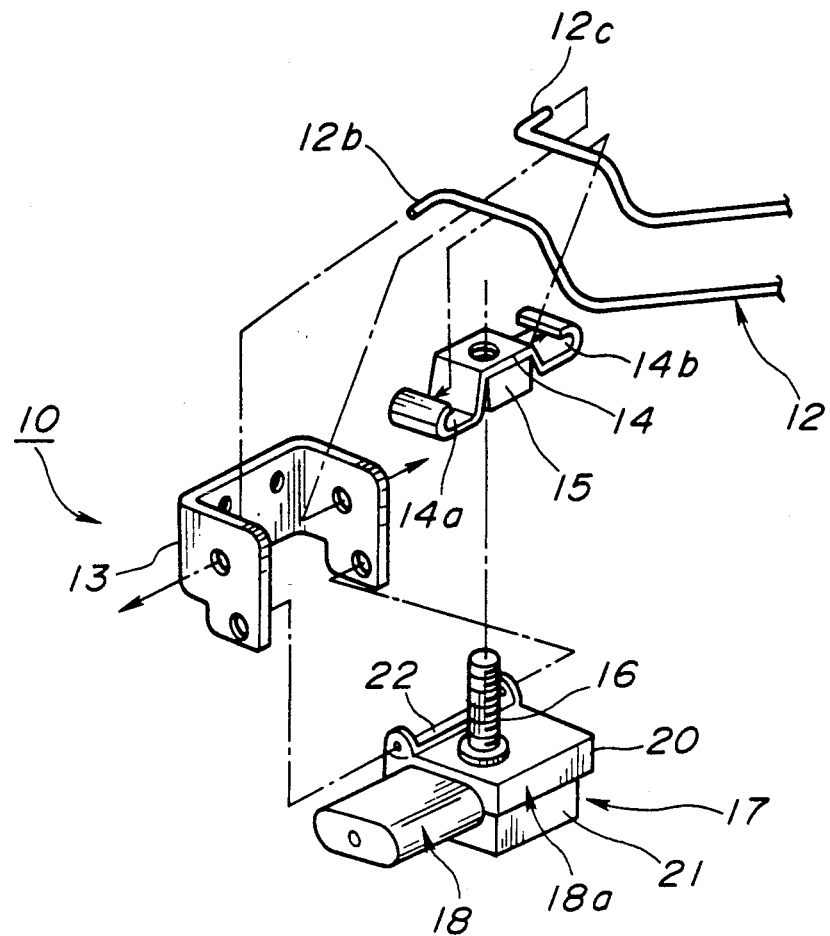
FIG. 7 is an exploded perspective view of an essential part of the lumbar support apparatus of FIG. 5.

The supporting bracket 14 is fixed to the nut member 15 and has supporting portions 14a and 14b. The supporting portions 14a and 14b are formed to support the end portions 12b and 12c of the spring member 12 as shown in FIG. 7 while allowing a sliding motion in a longitudinal direction of the spring member 12 which motion is interconnected with the swinging motion thereof.

An electric motor 18 and a gear box 18a are used as a driving source of the control mechanism 17 for rotating the screw shaft 16. The gear box 18a is installed in the casing 20 which is pivotably connected to the bracket 13 through a bracket member 22. As shown in FIG. 2, the gear box 18a is arranged such that one end of a rotation transmitting shaft 18b is connected to the electric motor 18 and the other end of the rotation transmitting shaft 18b is connected to a gear 16a which accelerates the rotation speed and transmits the speed to the screw shaft 16.

Figure 6:
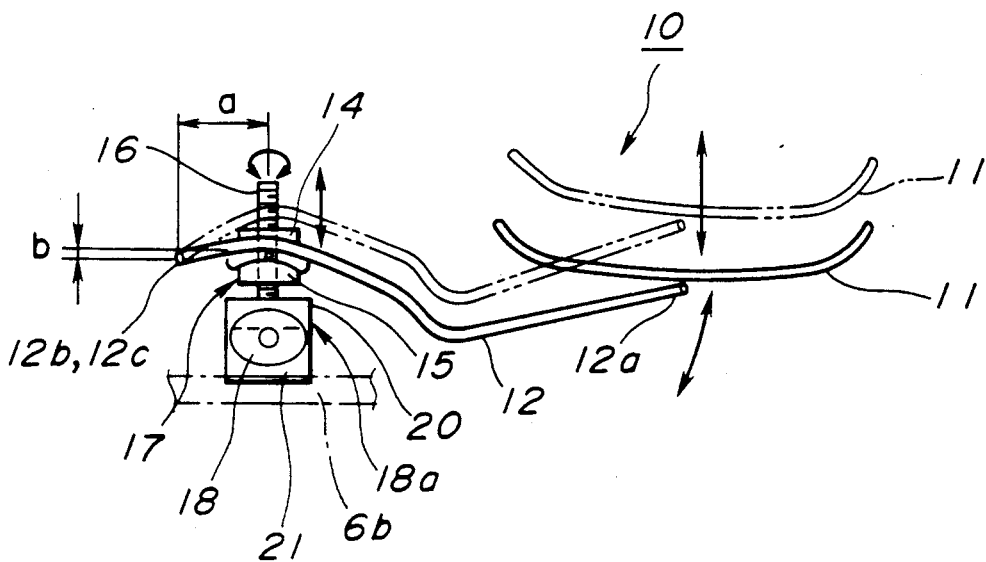
FIG. 6 is a schematic view for explaining an operation of the lumbar support apparatus of FIG. 5.

As clearly shown in FIG. 6, a distance a from the end portions 12b and 12c of the spring member 12 to the screw shaft 16 and a distance b along the screw shaft 16 from the center portion of the end portion of the spring member 12 to the center portion of the nut member 15, are variable to some degree. Accordingly, it is possible to provide the lumbar support apparatus 10 in a small size by utilizing the high degree of freedom in the installation of the nut member 15 and the like. Therefore, minimization of the space occupied the apparatus 10 is realized by locating the nut member 15 at a portion near the end portion 12b and 12c of the spring member 12 as possible.

Figure 3:
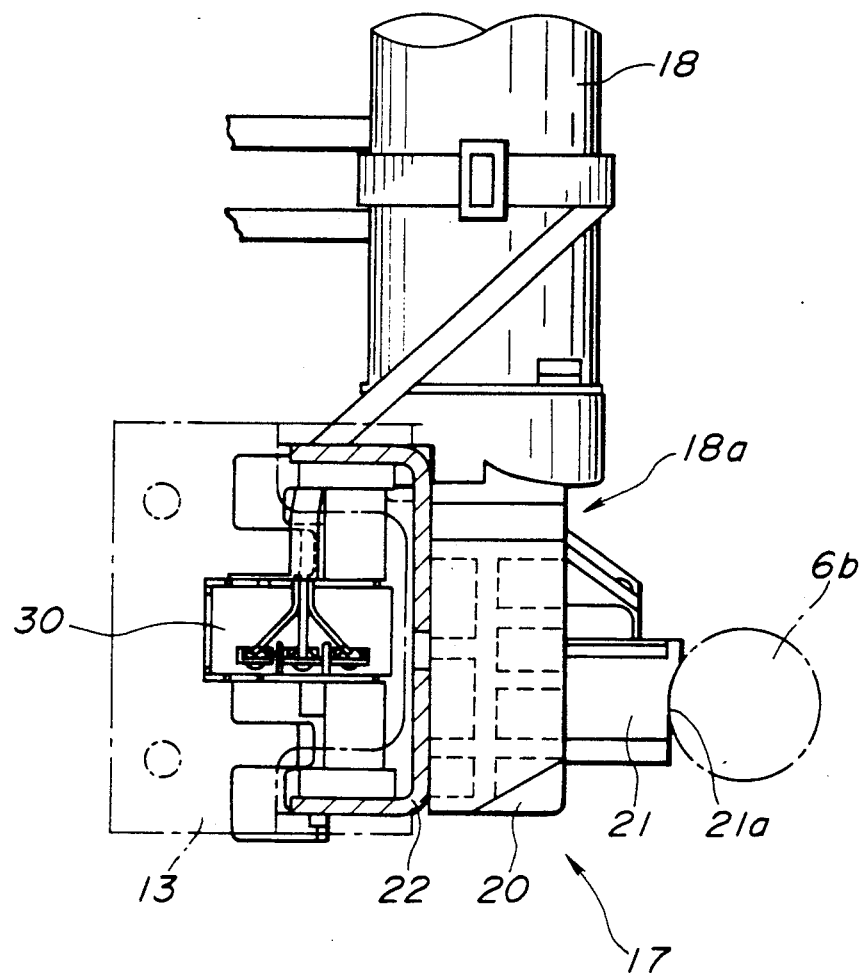
FIG. 3 is a side view of FIG. 2.
Figure 8:
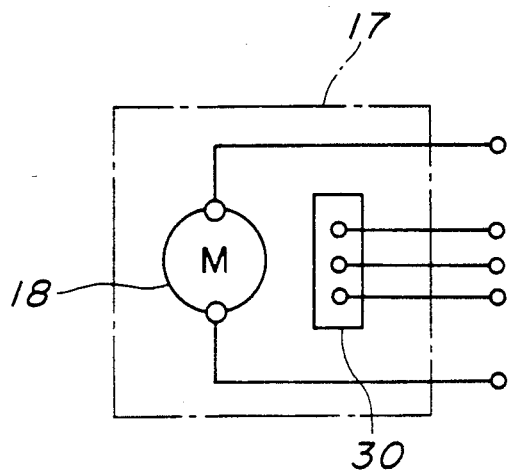
FIG. 8 is a circuit diagram for a motor applied to the lumbar support apparatus of FIG. 5.

A limit switch 30 is installed to the control mechanism 20 as shown in FIGS. 2 and 3, in order to detect the position of the nut member 15 relative to the screw shaft 16. The limit switch 30 is arranged as shown in FIG. 8 to control the driving of the electric motor 18 according to the detected signals indicative of the position of the nut member 15 in a manner of a conventional method.

Thus, the lumbar support apparatus 10 according to the present invention has structural properties as follows:

(1) The spring member 12 is directly and pivotally supported at its end portions 12b and 12c to the bracket 13; (2) The control mechanism 17 is arranged to push the spring member 12 at a portion near the end portions 12b and 12c; (3) The control mechanism 17 is arranged to cause a large stroke of the supporting panel 11 as a result of a small stroke, or displacement, of the nut member 15; (4) The spring member 12 is supported to the bracket 13 fixed to the seat back frame 6 and the control mechanism is fixedly in contact with the seat back frame 6.

Accordingly, with the thus arranged structure, the assembly operation is easily carried out such that the spring member 12 is directly connected to the bracket 13 in one step. Furthermore, since the spring member 12 is arranged such that its portion near the end portions 12b and 12c is pushed through the nut member 15 by the control mechanism 17, the apparatus can be made small in size.

Additionally, since the bracket 13 supporting the spring member 12 is fixed to the side panel 6a, and the stopper 21 which is integral with the gear box casing 20 is fixedly in contact with the lower pipe frame 6b, even if an impact force is applied to the lumbar support apparatus 10, such impact force will be; scattered or dissipated throughout the seat back frame 6 so as to prevent the impact force from being intensively applied to. As shown in FIG. 3, stopper 21 has an arcuate surface 21a with which the lower pipe frame 6b is fittingly in contact.

Furthermore, since the apparatus 10 according to the present invention is arranged such that an impact force applied to the lumbar support apparatus 10 is scattered to the seat back frame 6, the force applied to the casing 20 and the cover member 23 is decreased. This enables the casing 20 and the cover member 23 to be made even smaller and lighter.

While the preferred embodiment of this invention has been shown and described such that the electric motor 18 and the gear box 18a are used as a drive source for the control mechanism 17, it will be understood that changes and variations may be made without departing the spirit of scope of the invention. For example, the screw shaft 16 may be connected to a knob and rotated through the knob by manual operation.

What is claimed is:

1. A lumbar support apparatus for a vehicular seat having a seat back and a seat back frame disposed within said seat back, said seat back frame including a pair of side panels and a lower pipe frame, said lumbar support apparatus comprising:
    a supporting panel having a front side and a back side;
    a bracket fixed to one of said side panels;
    a spring member connected at one end to said back side of said supporting panel and pivotably supported at another end by said bracket; and
    a control mechanism connected to said bracket, said control mechanism being disposed between said spring member and said lower pipe frame, said control mechanism including:
    a nut member which bears against a portion of said spring member near the pivotably supported end; and
    a screw shaft screwed into said nut member, whereby said spring member is swingingly moved in forward and aft directions relative to said seat back according to a rotation of said screw shaft.

2. A lumbar support apparatus as claimed in claim 1, wherein said spring member is generally U-shaped, one end of said U-shaped spring member being pivotably supported by said bracket and the other end of said U-shaped spring member being connected to said back side of said supporting panel.

3. A lumbar support apparatus as claimed in claim 1, wherein said control mechanism further includes an electric motor for rotating the screw shaft and a gear box disposed between the screw shaft and the electric motor for accelerating the rotation speed of the electric motor.

4. A lumbar support apparatus as claimed in claim 1, wherein said control mechanism further includes a stopper having an arcuate surface with which the lower pipe frame is fittingly in contact.

5. A lumbar support apparatus as claimed in claim 1, wherein said supporting panel is located in the seat back such that the front side of said supporting panel supports a lumbar portion of an occupant of the vehicular seat.

6. A lumbar support apparatus installed in a seat back of a vehicular seat, said lumbar support apparatus comprising:
    a supporting panel having a front side and a back side;
    a seat back frame disposed within said seat back and having a pair of side panels and a lower pipe frame;
    a bracket fixed to one of said side panels;
    a spring member connected at one end to said back side of said supporting and pivotably supported at another end by said bracket;
    a nut member which bears against a portion of said spring member near the pivotably supported end; and a control mechanism connected to said bracket and disposed between said spring member and said lower pipe frame, said control mechanism including a screw shaft which is rotated in accordance with a predetermined command, the screw shaft being screwed to said nut member so as to move said spring member in forward and aft directions by rotation of the screw shaft.

7. A lumbar support apparatus according to claim 6, wherein said lower pipe frame of said seat back frame is disposed between said side panels, and said bracket is fixed to an inside surface of one of said side panels.

* * * * *